UNITED STATES PATENT OFFICE.

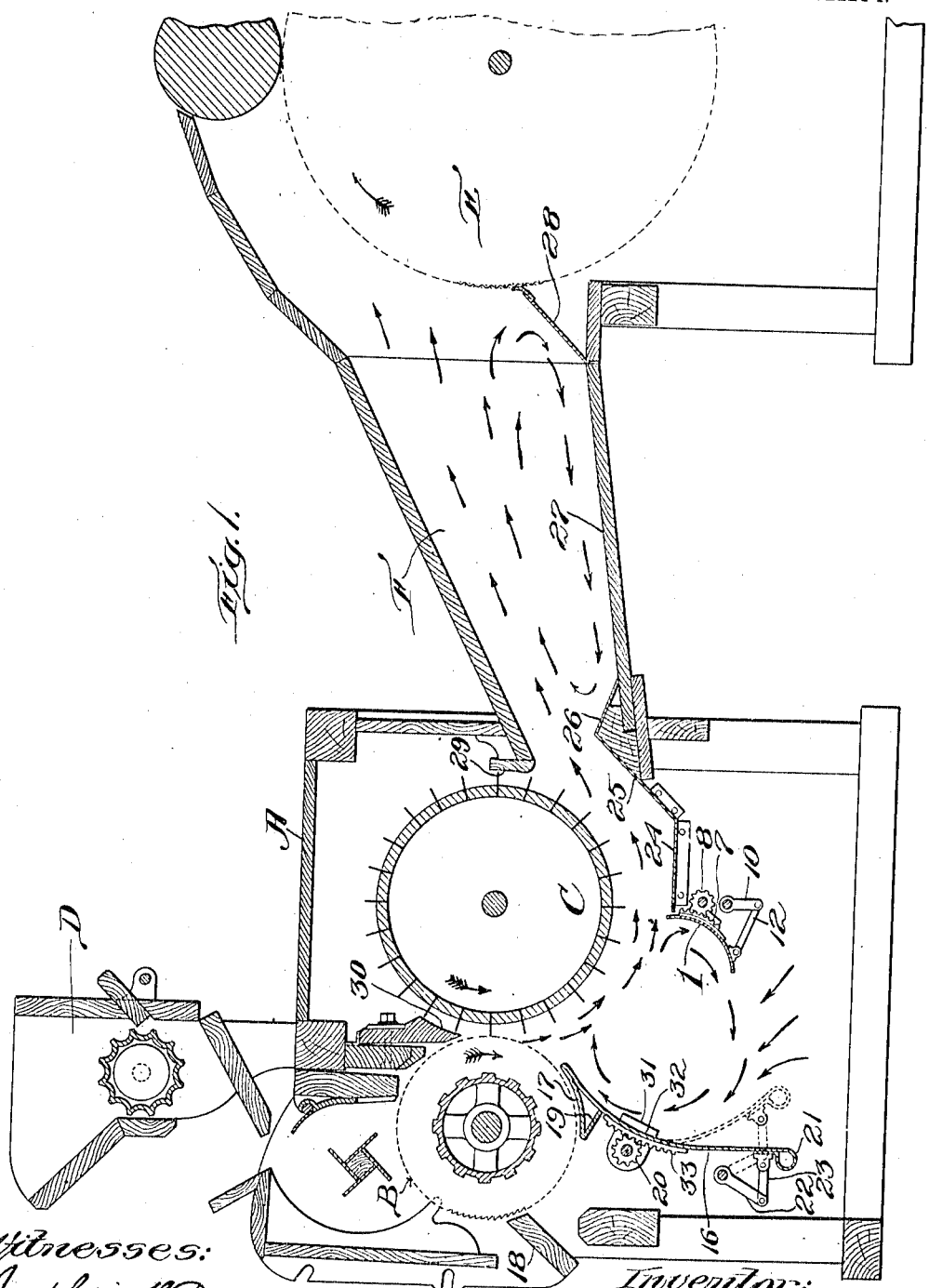

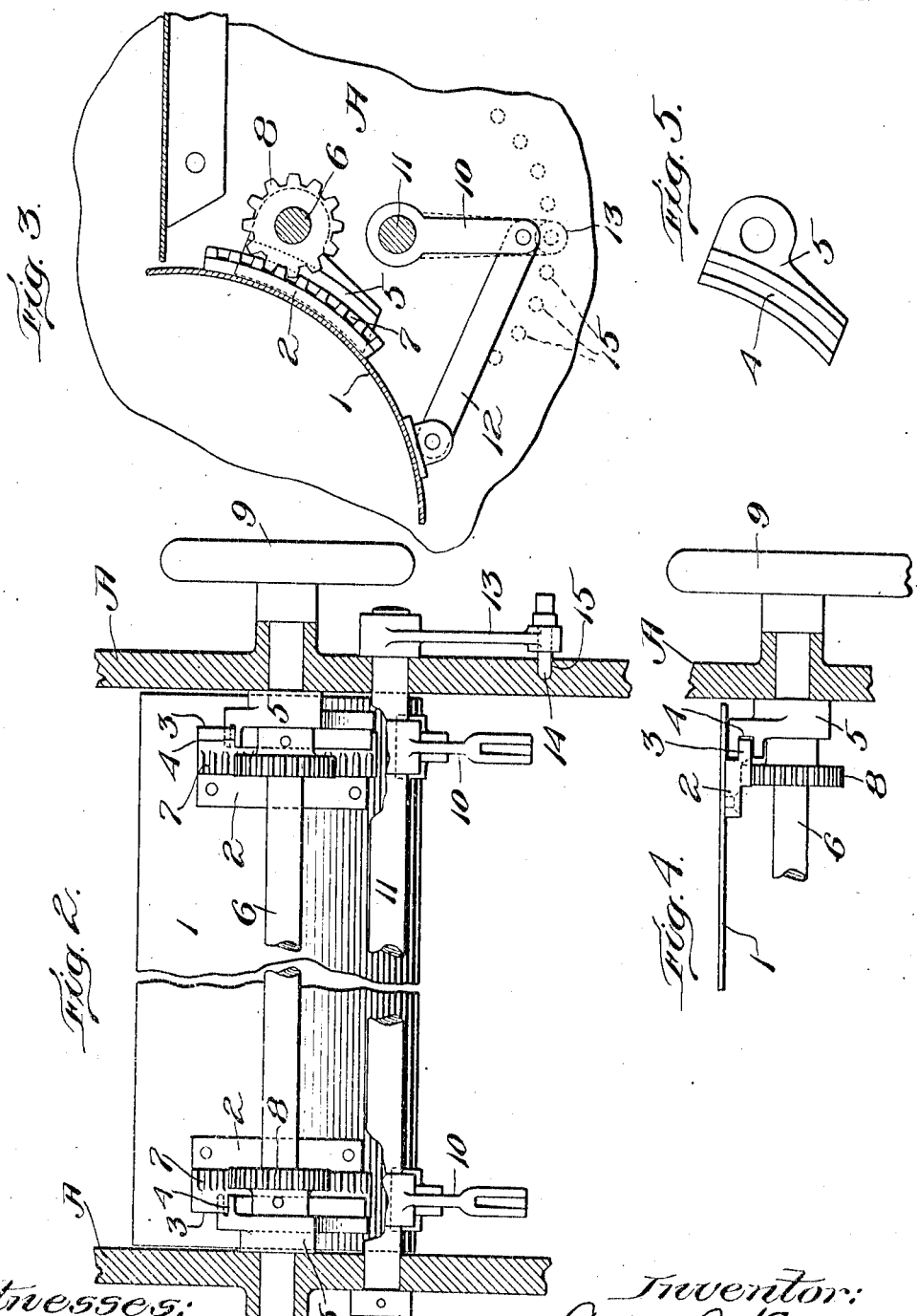

ARTHUR A. VARDELL, OF DALLAS, TEXAS.

COTTON-SEED LINTER.

1,102,177.　　　　　　Specification of Letters Patent.　　Patented June 30, 1914.

Application filed December 11, 1913. Serial No. 806,084.

*To all whom it may concern:*

Be it known that I, ARTHUR A. VARDELL, a citizen of the United States, and resident of Dallas, in the county of Dallas and State of Texas, have invented new and useful Improvements in Cotton-Seed Linters, of which the following is a specification.

This invention relates to cotton seed linters, that is, machines for removing from the cotton seeds the short fibers or lint which remain after the usual ginning process, and its object is to provide a machine of improved efficiency and mode of operation, especially in respect to its contrivances for moting, or separating the lint from motes and other dirt and trash.

To this end the invention consists essentially in the novel and improved construction and arrangement of parts, as hereinafter fully described and pointed out in the claims, for controlling the air currents by which the lint is separated from the motes and trash and conveyed to the condenser or place where the lint is collected. With the use of my invention cleaner lint, of better quality and higher grade, is obtained than with machines heretofore commonly used, and notwithstanding the high quality of the lint obtained there is practically no loss of the valuable lint along with the motes and trash.

In the accompanying drawings which illustrate one embodiment of the invention,—Figure 1 is a longitudinal sectional view of a cotton seed linter containing the invention; Fig. 2 is an enlarged front view, partly broken away, showing the adjustable mote board hereinafter described; Fig. 3 is a sectional view of said mote board showing said operating or adjusting mechanism in side elevation; Fig. 4 is a fragmentary view showing certain parts of said operating or adjusting mechanism in plan view; and Fig. 5 is a detail in side elevation of one of the guide ways for said mote board.

Referring to the drawings, A represents the linter housing or casing, in which are mounted the saw cylinder B, comprising a gang of saws, and the brush cylinder C, provided with a number of rows of bristles which lap the saw teeth a depth just sufficient to sweep the lint from the saws. D represents the linter feeder, through which the material is fed into the machine, and E represents the condenser cylinder covered with wire fabric upon which the lint is deposited in the form of a thin layer or bat. The several cylinders rotate respectively in the directions indicated by the arrows thereon. The parts thus far mentioned may be of usual construction and operation, and will be sufficiently understood by those skilled in the art without more detailed description.

It will be understood that the lint cut from the cotton seeds is carried over into the housing by the saw teeth, and that the brush cylinder C rotating at a high rate of speed, higher than the saw cylinder, brushes the lint downward from the saw teeth, partly by directly striking the fibers, but chiefly by the air draft created by the rapidly rotating brush cylinder; also that the rotating brush cylinder C at the entrance of the lint flue F creates the air current through the lint flue which carries the lint or cotton fibers to the condenser E.

The present invention has to do principally with the construction and mode of operation of the mote board, the lint flue, draft shield, and other parts, for controlling the air currents and effecting the more perfect separation of the lint from the motes and trash.

The bottom wall of the lint flue F extends forward underneath the brush cylinder C, terminating at a point substantially directly underneath the axis of the brush cylinder and quite close to the periphery of the brush cylinder as shown, and is secured to the sides of the linter housing in fixed relation to the brush cylinder. At the entrance of said flue and adjacent to the end of the bottom wall of the flue underneath the brush cylinder is a mote board 1, extending across the linter casing and having a downwardly and forwardly curved surface, said mote board being preferably formed of a curved piece of sheet metal. Near each end of the mote board 1 is secured a casting 2 formed with an outwardly facing curved flange 3, sliding in a similarly curved inwardly facing channel 4, which constitutes a guideway in another casting 5. The castings 5, one for each end of the mote board, are pivotally mounted on shaft 6 which is journaled in the sides of casing A. Thus, the mote board 1 may be adjusted upward and downward by sliding the flanges 3 in guide channels 4, and may also be adjusted angularly by swinging its lower edge backward and forward on the pivoted connection between castings 5 and shaft 6.

The mechanism for effecting such vertical adjustment, as herein shown, consists of racks 7 formed on each casting 5, and pinions 8 fast to shaft 6 and in mesh with said racks 7. Shaft 6 may be rotated by means of a hand wheel 9 on the outer end of the shaft thereby moving the mote board upward or downward in its guideways. The mechanism for effecting such horizontal or angular movement of the mote board, as herein shown, consists of a pair of levers 10, fast to a shaft 11 which is journaled in the sides of the housing, said levers being connected by links 12 to the lower part of the mote board. At the outer end of shaft 11 is an operating lever 13 by which the shaft may be rocked, and a movable pin 14 in the end of lever 13, engages a series of holes 15 in the wall of the housing and holds the mote board in any one of its several positions of angular adjustment. Opposite said mote board and underneath the saw cylinder is a wind shield or draft shield 16, preferably made of a piece of flexible sheet metal, extending across the linter housing. The upper part of said shield is forwardly and downwardly bent toward the front of the machine so as to extend part way around the lower side of the saw cylinder, in close proximity thereto and following the curve of the periphery of the saws, as shown at 17, thus cutting off to some extent the air passing through the saws and between the saw cylinder and the shield 16, and out under the rail 18 of the gratefall. The curved part 17, has an inturned lip 19 which bears against the body of shield 16 and supports the curved part 17. A casting 31 with a curved groove 32 is secured to each side of the housing A, and the edges of the shield 16 are supported and guided in said grooves. A rack 33 is fastened to the outer side of shield 16 and is engaged by a pinion 20, mounted on a shaft extending outside the housing, by which shaft the rack and pinion are operated. To adjust the top of the shield 16 with relation to the saws the pinion 20 is rotated. By curving the shield 16 toward the brush cylinder C, so that its surface if projected would be approximately tangent to the saws, there will be no appreciable angle or pocket formed between the surface of the shield 16 and the surface of the saw cylinder, in which cotton might collect. The shield 16 extends downward underneath the saw cylinder, and terminates in a roll or bead 21 at the bottom to stiffen it. The shield 16 being flexible may be bent more or less to vary its angular adjustment, to vary the space between the lower edge thereof and the mote board, and to increase the curvature of its surface, as illustrated by dotted lines, for governing the air current, as presently to be described. The shield is flexed by means of the lever 22 and link 23, which are actuated by a rock shaft journaled in the walls of the housing.

The operation of the machine as thus far described, and its action on the cotton, motes and air, is as follows:—The air current generated by the rapid rotation of the brush cylinder, assisted by the direct action of the bristles, removes the cotton and trash from the saw teeth and projects it in a downward direction from the point of contact between the saws and brush. Pieces of trash or motes which are sufficiently heavy will fall straight down to the floor of the housing, while the cotton and lighter trash or motes will follow the strong air current produced by the brush toward the entrance of the flue, as indicated by the arrows. At the entrance of the flue the air current is divided, part passing into and through the flue and part being deflected by the mote board 1, downward and forward, forming a cyclone-like return current. Said return current upon leaving the mote board flows across the open space between the mote board 1 and wind shield 16, which extends downward a little beyond the level of the mote board, then encounters the surface of the wind shield 16, the latter being preferably somewhat curved, and passes upward along its face, and thence is deflected back again and joins the main air current first mentioned. A gentle draft of air is also lifted and drawn upward through the space between the mote board and draft shield, by the action of the brush, and joins the said return current flowing upward over the face of the draft shield. The above described currents are indicated by the arrows. The lighter and cleaner lint passes with the main air current immediately from the saws into the lint flue, while the motes and trash mingled with a certain quantity of cotton, being relatively heavy will travel in the lower part of the air current, and will be turned back by the mote board 1 and pass with the deflected lower part of the air current into the cyclone-like return current. As the material passes across the space between the mote board and the draft shield, the motes and trash will drop out, the current at that point being comparatively gentle, while the light cotton will continue with the return air current, which is augmented by the draft of air arising from below through said open space as indicated by the arrows, and join the main current of air and cotton into the lint flue.

In order to intercept and deflect a greater or less part of the air current passing into the lint flue and thereby strip off more or less of the stream of cotton carrying the motes, the operator may adjust the mote board 1 vertically, so that it will extend a greater or less distance across the entrance to the lint flue. It will be understood that the adjustable mote board is entirely independent of the walls of the flue, which are fixed. By adjusting the mote board or the draft shield, or both, angularly, the direction and speed of the cyclone-like return current may be varied and the volume and speed of the air current lifted between the mote board and the draft shield may be varied. Thus there is afforded complete control and government of the air currents, according to the requirements of the quality of the material being treated, the speed of the saw cylinder or brush cylinder, or the other conditions of the particular work in hand.

The high speed of the saw cylinder creates close to its periphery a counter draft tending to draw some of the cotton over the top of the wind shield, and to drop it on the outside of the shield where it is wasted. This tendency is reduced by that portion 17, of the shield which follows the periphery of the saws. Part 17 of the shield should be adjusted close to the saws and will aid in preventing cotton from blowing over between the saws and the shield and out of the machine under the rail 18. Some cotton will probably find its way into the space between the saws and shield 17, but the space is so small that the saws will again pick it up and carry it around to the brush.

Referring now to the novel features of the lint flue, the bottom wall begins substantially directly underneath the axis of the brush cylinder. Thence the bottom wall extends rearwardly in a substantially horizontal direction as indicated by the part 24, which is fixed between the sides of the housing; thence it rises at an angle of about 45° as shown at 25, following in a general way the contour of the brush cylinder; thence it again descends at an angle of about 20°, forming a barrier 26, in the form of an inverted V about opposite the intake end of the upper wall of the lint flue F; and thence it extends rearwardly and a little upwardly to the condenser cylinder E, as shown at 27. These parts are all fixed, and the surfaces 24, 25 and 26 are preferably covered with sheet metal. At the rear end of the flue an inclined plane 28 of sheet metal, with a leather strip at its upper edge to bear on and make a close joint with the condenser cylinder E, rises at an angle about 45° from the bottom of the flue, and prevents a pocket from being formed at the corner of the flue next to the condenser in which cotton might lodge.

The action of the air current and cotton in the lint flue is as follows: The air current passing through the comparatively narrow part of the flue between the brush and walls 24 and 25, is strong and free from tendency to back currents. After passing the restricted part of the flue near the brush formed by the barrier 26, the current tends to expand as it approaches the condenser cylinder through the widening part of the flue. A back eddy or back current tends to form between the inclined plane 28 and along the bottom of the flue, bringing some lint back with it, which, upon meeting the barrier 26, will be deflected upwardly, and again join the strong current entering through the restricted area above the barrier, and pass on to the condenser. This arrangement effectively prevents any of the cotton from passing with the back eddy out of the flue, as it tends to do without the barrier to deflect it back into the main stream passing to the condenser. No lint can return from the condenser after it once passes the barrier.

The seal board 29, and the so-called division board 30, which also acts as a seal board at that place, each serving to cut off the undue flow of air with the brush cylinder at the points respectively controlled by them, instead of being of usual construction are made with concave surfaces, following the contour of the brush cylinder, and of sufficient length to span at least two rows of bristles, so that they will in all positions of the brush cylinder coöperate with at least one row of bristles to perform their functions of checking the draft created by the brush.

I believe that the principle of the invention and the essential condition which contributes to the successful operation of the machine in respect to its function of moting or separating the cotton fibers from the motes and trash, consists in producing the cyclone-like return current of air, for conveying that part of the stream of cotton which carries the motes back across an open space through which the heavy particles drop out, while the light fibers pass along with the return current and again join the main current into the flue. While the mote board and wind shield above described are the best means known to me of accomplishing the desired result, I wish to have it understood that my invention is not limited to any specific construction but in its broader aspects comprehends any suitable means for deflecting part of the air current at the entrance to the flue, into such return current which again joins the main current after the heavier particles have dropped out, carrying with it the lighter particles. Conceivably, such return current might be created by a mote board alone, having a suitably shaped air controlling surface to give the deflected draft the necessary upward return course; but I believe the best results will be obtained with the use also of a wind shield, and especially with provision for the relative adjustment of the mote board and the wind shield, for the purposes hereinbefore set forth.

Without intending to restrict my invention in any way to any particular dimensions or proportions, I will for the sake of clearness, furnish certain dimensions with which I have obtained good results. In a machine having a brush cylinder of about twenty inches outside diameter, the distance from the periphery of the brush cylinder to the nearest point of the flue surfaces 24 and 25 may be, in each case about three and one-half inches. The distance from the apex of the V-shaped barrier 26, which stands about two inches high, to the nearest point of the top wall of the flue, may be about five inches. The radius on which the curve of the mote board 1 is described may be about six inches, and the mote board may be about six inches across from top to bottom. The wind shield 16 may be about sixteen inches deep. And the inclined plane 28 may be about six inches wide from top to bottom. All of the foregoing measurements may however be varied without departing from the principle of my invention.

I claim:

1. In a cotton seed linter, a saw cylinder, a brush cylinder, a flue leading from the brush cylinder and said brush cylinder adapted to create an air current toward and through the flue, means at the entrance of said flue to deflect a part of the air current into a cyclone-like return current, and a draft shield extending from a point directly underneath and closely adjacent to the periphery of the saw cylinder downward opposite the flue entrance.

2. In a cotton seed linter, a saw cylinder, a brush cylinder, a flue leading from the brush cylinder, said brush cylinder adapted to create an air current toward and through the flue, a mote board at the entrance of said flue having a surface adapted to deflect a part of said air current into a cyclone-like return current, and a draft shield extending from a point directly underneath and closely adjacent to the periphery of the saw cylinder downward opposite the flue entrance and terminating above the floor.

3. In a cotton seed linter, a saw cylinder, a brush cylinder, a flue leading from the brush cylinder, said brush cylinder adapted to create an air current toward and through the flue, means at the entrance of said flue to deflect a part of the air current into a cyclone-like return current, and a draft shield extending from a point closely adjacent to the periphery of the saw cylinder and at the side of the saw cylinder toward the brush cylinder downward opposite the flue entrance.

4. In a cotton seed linter, a saw cylinder, a brush cylinder, a flue, a mote board at the entrance of said flue, and a draft shield extending from a point directly underneath and closely adjacent to the periphery of the saw cylinder downward opposite the flue entrance.

5. In a cotton seed linter, a saw cylinder, a brush cylinder, a flue, a mote board at the entrance of said flue, and a draft shield underneath said saw cylinder and extending from a point closely adjacent to the periphery of the saw cylinder downward opposite the flue entrance, said draft shield being angularly adjustable at its lower end with relation to said mote board.

6. In a cotton seed linter, a saw cylinder, a brush cylinder, a flue, a mote board at the entrance of said flue, and a draft shield underneath said saw cylinder and extending from a point closely adjacent to the periphery of the saw cylinder downward opposite the flue entrance, said draft shield being adjustable up and down with relation to the periphery of the saw cylinder.

7. In a cotton seed linter, a saw cylinder, a brush cylinder and a flue leading from the brush cylinder, said brush cylinder adapted to create an air current toward and through the flue, and a downwardly and forwardly curved mote board at the entrance of said flue under the brush cylinder adapted to intercept a part of said air current and deflect the same into a cyclone-like return current.

8. In a cotton seed linter, a saw cylinder, a brush cylinder and a flue leading from the brush cylinder, said brush cylinder adapted to create an air current toward and through the flue, a downwardly and forwardly curved mote board at the entrance of said flue under the brush cylinder adapted to intercept a part of said air current and deflect the same into a cyclone-like return current, and mechanism to adjust said curved mote board vertically with relation to the flue bottom.

9. In a cotton seed linter, a saw cylinder, a brush cylinder and a flue leading from the brush cylinder, said brush cylinder adapted to create an air current toward and through the flue, a downwardly and forwardly curved mote board at the entrance of said flue under the brush cylinder adapted to intercept a part of said air current and deflect the same into a cyclone-like return current, and mechanism to adjust the bottom edge of the said mote board forward and backward.

10. In a cotton seed linter, a saw cylinder, a brush cylinder and a flue leading from the brush cylinder, said brush cylinder adapted to create an air current toward and through the flue, a downwardly and forwardly curved mote board at the entrance of said flue under the brush cylinder adapted to intercept a part of said air current and deflect the same into a cyclone-like return current, the lower edge of said mote board being horizontally adjustable, and a rack and pinion to adjust said mote board vertically.

11. In a cotton seed linter, a saw cylinder, a brush cylinder and a flue leading from the brush cylinder, said brush cylinder adapted to create an air current toward and through the flue, means at the entrance of said flue to deflect a part of said air current downward and forward into a return current, and a draft shield opposite such deflecting means adapted to direct the course of said return current upward again to join the air current toward the flue.

12. In a cotton seed linter, a saw cylinder, a brush cylinder, and a flue leading from the brush cylinder, said brush cylinder adapted to create an air current toward and through the flue, means at the entrance of said flue to deflect a part of said air current downward and forward into a return current, and a draft shield opposite such deflecting means extending downward from a point closely adjacent to and immediately underneath the saw cylinder, adapted to direct the course of said return current upward again to join the air current toward the flue.

13. In a cotton seed linter, a saw cylinder, a brush cylinder and a flue leading from the brush cylinder, said brush cylinder adapted to create an air current toward and through the flue, means at the entrance of said flue to deflect a part of said air current downward and forward into a return current, and an angularly adjustable draft shield opposite such deflecting means adapted to direct the course of said return current upward again to join the air current toward the flue.

14. In a cotton seed linter, a saw cylinder, a brush cylinder and a flue leading from the brush cylinder, said brush cylinder adapted to create an air current toward and through the flue, means at the entrance of said flue to deflect a part of said air current downward and forward into a return current, and a draft shield opposite such deflecting means and spaced apart therefrom, the upper edge of said shield being adjustable upward and downward and the lower edge being adjustable forward and backward with relation to said deflecting means.

15. In a cotton seed linter, a saw cylinder, a brush cylinder, and a flue leading from the brush cylinder, said brush cylinder adapted to create an air current toward and through the flue, means at the entrance of said flue to deflect a part of said air current downward and forward into a return current, and a flexible draft shield opposite such deflecting means and spaced apart therefrom, adapted to be bent to form a varyingly curved surface and to vary the distance between the lower edge thereof and said deflecting means.

16. In a cotton seed linter, a saw cylinder, a brush cylinder, and a flue leading from the brush cylinder, said brush cylinder adapted to create an air current toward and through the flue, means at the entrance of said flue to deflect a part of said air current downward and forward into a return current, and a draft shield opposite such deflecting means adapted to govern the upward course of said return current, said draft shield being adjustable relatively to the saw cylinder.

17. In a cotton seed linter, a saw cylinder, a brush cylinder, a flue, a mote board at the entrance of said flue, and a draft shield extending partway around the lower side of the saw cylinder in close proximity thereto and following the curve of the periphery of the saws, and thence extending downward from said saw cylinder opposite said mote board.

18. In a cotton seed linter, a saw cylinder, a brush cylinder, a flue, a mote board below and having its upper edge approximately in the vertical plane of the axis of the brush cylinder, adapted to deflect part of the air current created toward the flue by the brush cylinder into a cyclone-like return current, and a draft shield below the saw cylinder adapted to govern the upward course of said return current.

19. In a cotton seed linter, a saw cylinder, a brush cylinder, a flue, a mote board below the brush cylinder adapted to deflect part of the air current created toward the flue by the brush cylinder into a return current, and a draft shield below the saw cylinder adapted to govern the upward course of said return current, both said mote board and said draft shield being angularly adjustable each with relation to the other.

20. In a cotton seed linter, a saw cylinder, a brush cylinder and a flue leading from the brush cylinder, the bottom wall of the flue extending forward to a point substantially underneath the axis of the brush cylinder, a downwardly and forwardly curved mote board at the end of the bottom wall of the flue, said mote board being adjustable both vertically and angularly, and an angularly adjustable draft shield arranged opposite said mote board and extending downward below the level of said mote board with an open space therebetween.

Signed by me at Dallas, Texas, this sixth day of December 1913.

ARTHUR A. VARDELL.

Witnesses:
 GEO. C. WALSH,
 OLIN BROOKS.